United States Patent [19]

Blum et al.

[11] Patent Number: 5,064,921

[45] Date of Patent: Nov. 12, 1991

[54] HYDROXY FUNCTIONAL COPOLYMERS, A PROCESS FOR THE PREPARATION AND THEIR USE AS BINDERS OR BINDER COMPONENTS

[75] Inventors: Harald Blum, Wachtendonk; Josef Pedain, Cologne; Peter Höhlein, Kempen; Christian Wamprecht, Neuss, all of Fed. Rep. of Germany

[73] Assignee: Bayer Aktiengesellschaft, Leverkusen, Fed. Rep. of Germany

[21] Appl. No.: 529,995

[22] Filed: May 25, 1990

[30] Foreign Application Priority Data

Jun. 7, 1989 [DE] Fed. Rep. of Germany ....... 3918528

[51] Int. Cl.$^5$ .................... C08F 222/40; C08F 220/10; C08F 12/02; C08F 210/14
[52] U.S. Cl. .................... 526/262; 526/328; 526/346; 526/348.6
[58] Field of Search ...................... 526/262; 525/327.6

[56] References Cited

U.S. PATENT DOCUMENTS

| | | | |
|---|---|---|---|
| 3,784,396 | 1/1974 | Fourment et al. ................... | 117/21 |
| 3,878,151 | 4/1975 | Dachs et al. ........................ | 260/29.6 |
| 3,983,095 | 9/1976 | Bashaw et al. ....................... | 526/15 |
| 3,998,994 | 12/1976 | Decroix et al. ..................... | 526/15 |
| 4,155,957 | 5/1979 | Sasayama ............................ | 260/897 |
| 4,452,948 | 6/1984 | Marrion et al. ..................... | 525/207 |

FOREIGN PATENT DOCUMENTS

| | | |
|---|---|---|
| 1745954 | 9/1971 | Fed. Rep. of Germany . |
| 63-308012 | 12/1988 | Japan . |
| 1-062313 | 3/1989 | Japan . |

OTHER PUBLICATIONS

M. Yamada, T. Takase, T. Tsukano, Y. Ueda, N. Koutou; Kobunshi Kagaku, 26 (292), 593-601, 1969 (CA 72 (6): 21964u) Note: Only Abstract is Available.

Primary Examiner—Joseph L. Schofer
Assistant Examiner—Wu C. Cheng
Attorney, Agent, or Firm—Joseph C. Gil; Thomas W. Roy

[57] ABSTRACT

The present invention relates to hydroxy functional polyacrylate copolymers having a molecular weight ($M_n$) of about 2000 to 30,000 and containing a) about 1 to 70% by weight of structural units corresponding to the formula

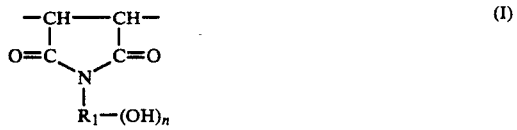

The present invention also relates to a process for the preparation of these hydroxy functional copolymers by reacting the corresponding anhydride functional copolymers with amino alcohols. Finally, the present invention also relates to the use of these hydroxy functional copolymers as binder components in combination with polyisocyanates for the production of polyurethane lacquers, coatings, sealants, adhesives or printing inks.

8 Claims, No Drawings

HYDROXY FUNCTIONAL COPOLYMERS, A PROCESS FOR THE PREPARATION AND THEIR USE AS BINDERS OR BINDER COMPONENTS

BACKGROUND OF THE INVENTION

1. Field of the Invention

This invention relates to new hydroxy functional copolymers containing imide structural units, to a process for the preparation of such copolymers and to their use as binders or binder components for the production of lacquers, coatings, sealants, adhesives or printing inks.

2. Description of the Prior Art

Copolymers of acrylic and vinyl monomers were distinguished by numerous outstanding properties such as resistance to hydrolysis and weathering, resistance to yellowing and gloss retention. Reactive substances which were valuable for the coatings industry were obtained by the incorporation of functional groups such as hydroxyl groups. The products obtained were used in large quantities for lacquers, coatings, adhesives, printing inks and sealing compounds. The introduction of hydroxyl groups is normally achieved by the copolymerization of hydroxy functional monomers such as hydroxyethyl methacrylate. To obtain high crosslinking densities, it is necessary to incorporate relatively large quantities of hydroxy functional monomers, with the result that the amount of variation of the other monomers is restricted and the products obtained were relatively expensive.

Polyimides may be prepared, for example, from diamines and bisanhydrides such as pyromellitic acid bisanhydride. They were distinguished inter alia by their excellent electric insulating properties and high thermostability during continuous use. One serious disadvantage of these substances is their poor solubility which necessitates the use of large quantities of solvents which were not physiologically harmless such as dimethyl acetamide.

A process for the preparation of ethanol imide derivatives from styrene/maleic acid anhydride cotelomers having average molecular weights $M_n$ of from 650 to 1600 is described in DE-OS 1 745 954. This process initially results in cross-linked, gel type products which were converted into low molecular weight ethanol imide products only when heated to 150°–250° C. Such a process cannot be controlled when carried out on a commercial scale and is uneconomical since it requires up to a ten-fold excess of ethanolamine. Further, polymers having relatively high molecular weights cannot be prepared by this process.

The cotelomers obtained by this process were unsuitable for use as high quality binders in lacquers, adhesives, coatings, sealants or printing inks because of their fixed chemical composition and their very low molecular weight. In addition, their complete solubility is only achieved in unconventional solvents such as chloroform, methylene chloride or methanol.

It is an object of the present invention to provide new binders or binder components for lacquers, coatings, sealants, adhesives or printing inks which combine the advantages of the copolymers and polyimides known in the art, but which also overcome their disadvantages. This object may be achieved with the hydroxy functional copolymers having imide structural units described below and the process for their preparation.

The copolymers according to the invention described below were easily prepared, soluble in the commonly used lacquer solvents and suitable for many fields of application due to their molecular weight and their composition which may be varied within wide limits. The ease with which they can be prepared is due to the surprising finding that the special anhydride functional copolymers used as intermediate products can be modified by a reaction with suitable amino alcohols to yield uncrosslinked, readily soluble hydroxy functional copolymers containing imide structural units. This is surprising in view of the fact that it is known that organic polyanhydrides react with amino alcohols to form cross-linked, insoluble products (EP-A-48 128 (U.S. Pat. No. 4 452 948), DE-OS 1 769 466 (U.S. Pat. No. 3 878 151), DE-OS 2 214 450, DE-OS 2 405 981, U.S. Pat. No. 4 155 957 and DE-OS 2 214 451.

SUMMARY OF THE INVENTION

This invention relates to hydroxy functional copolymers having a molecular weight ($M_n$) of about 2000 to 30,000, preferably about 2600 to 8000 and containing a) about 1 to 70% by weight of structural units corresponding to formula I

b) about 1 to 75% by weight of structural units corresponding to formula II

c) about 15 to 98% by weight of structural units corresponding to formula III

and d) about 0 to 15% by weight, preferably about 0 to 5% by weight of other structural units which are derived from chemically incorporated polyfunctional monomers containing 2 or more copolymerizable, unsaturated bonds wherein said percentages add up to 100 and wherein n represents an integer having a value of 1 to 5, $R_1$ represents a hydrocarbon group which has a valency of (n+1), contains a total of 2 to 20 carbon atoms and may contain oxygen and/or nitrogen in the form of ether, ester, amide, tertiary amine, urethane, keto, nitrile or nitro groups and/or may contain halogens as substituents.

$R_2$ represents hydrogen, a methyl or ethyl group or chlorine or fluorine, $R_3$ represents an aliphatic hydrocarbon group containing 2 to 15 carbon atoms, a cycloaliphatic hydrocarbon group containing 5 to 10 carbon atoms, an araliphatic hydrocarbon group containing 7 to 18 carbon atoms, an aromatic hydrocarbon group containing 6 to 12 carbon atoms, chlorine, fluorine, a nitrile group or an aliphatic hydrocarbon group which contains 2 to 18 carbon atoms and may contain oxygen and/or nitrogen in the form of ether, ester, amide, urethane or keto groups, $R_4$ represents hydrogen or together with $R_3$ and the two carbon atoms forms a cycloaliphatic hydrocarbon ring having 5 or 6 carbon atoms, $R_5$ represents an aliphatic or cycloaliphatic hydrocarbon group which contains 1 to 18 carbon atoms and may contain oxygen or nitrogen as heteroatoms and $R_6$ represents hydrogen or a methyl group.

The present invention also relates to a process for the preparation of these hydroxy functional copolymers by reacting anhydride functional copolymers which correspond to the hydroxy functional copolymers with amino alcohols which correspond to formula IV

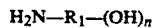

$$H_2N-R_1-(OH)_n \qquad IV$$

wherein n and $R_1$ have the meanings indicated above at 100° to 200° C. in amounts sufficient to maintain an equivalent ratio of amino groups to acid anhydride groups of at least 1:1 to form imide groups, and distilling the water formed either during the reaction and/or subsequently.

The invention also relates to the use of these hydroxy functional copolymers as binder components in combination with polyisocyanates for the production of polyurethane lacquers, coatings, sealants, adhesives or printing inks.

DETAILED DESCRIPTION OF THE INVENTION

Preferred hydroxy functional copolymers were those wherein n represents an integer having a value of 1 to 3, preferably 1 or 2, $R_1$ represents an aliphatic hydrocarbon group which has a total of 2 to 13, preferably 2 to 4 carbon atoms, and may contain ester groups, $R_2$ represents hydrogen, a methyl or ethyl group or chlorine, $R_3$ represents a phenyl group, $R_4$ represents hydrogen, $R_5$ represents an aliphatic hydrocarbon group having 1 to 18 carbon atoms and $R_6$ represents hydrogen or a methyl group.

The particularly preferred hydroxy functional copolymers according to the invention contain, per 100 parts by weight, a) about 5 to 55, preferably about 10 to 45 parts by weight of structural units corresponding to formula I, b) about 3 to 60, preferably about 5 to 50 parts by weight of structural units II and c) about 25 to 85, preferably about 30 to 75 parts by weight of structural units III, said parts by weight up to 100.

The hydroxy functional copolymers according to the invention were prepared by the reaction of the corresponding anhydride functional copolymers with amino alcohols corresponding to the formula IV as will be described in detail below. According to another embodiment of this process, the hydroxy functional copolymers thus obtained were further modified with lactones to give rise to ring opening ester formation.

The anhydride functional copolymers which were used as starting materials in the process according to the invention were copolymers prepared in known manner from the following quantities of monomers, based on a total of 100 parts by weight of monomers:

a') about 1 to 50 parts by weight, preferably about 5 to 40 and more preferably about 10 to 25 parts by weight of anhydride functional monomers, b') about 1 to 75 parts by weight, preferably about 3 to 60 and more preferably about 5 to 50 parts by weight of monomers corresponding to formula V

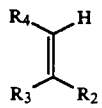

c') about 15 to 98 parts by weight, preferably about 25 to 85 and more preferably about 30 to 75 parts by weight of monomers corresponding to formula VI

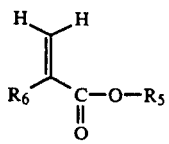

and d') 0 to about 15 parts by weight, preferably about 0 to 5 parts by weight of polyfunctional substances containing 2 or more copolymerizable, unsaturated bonds; said parts by weight adding up to 100.

Suitable or preferred monomers a' include maleic acid anhydride, itaconic acid anhydride and citraconic acid anhydride; maleic acid anhydride is particularly preferred.

Suitable or preferred monomers b') include styrene, vinyl toluene, α-methyl styrene, α-ethyl styrene, diethyl styrene which may be in the form of isomeric mixtures and may be substituted in the nucleus, isopropyl styrenes, butyl styrenes, methoxy styrene, ethylvinyl ether, n-propylvinyl ether, isopropylvinyl ether, n-butylvinyl ether, isobutylvinyl ether, vinyl acetate, vinyl propionate, vinyl butyrate, 1-octene, 1-decene, 1-hexene, 2-methyl-1-heptene, 2,4,4-trimethyl-1-pentene, 1-nonene, 1-dodecene, 1-tridecene, 1-tetradecene, vinyl cyclohexene, cylooctene, cyclohexene and mixtures of these monomers.

Suitable or preferred monomers c' include methyl acrylate, methyl methacrylate, ethyl acrylate, ethyl methacrylate, n-butyl acrylate, n-butyl methacrylate, isobutyl acrylate, iso-butyl methacrylate, tert.-butyl acrylate, tert.-butyl methacrylate, 2-ethylhexyl acrylate, 2-ethylhexyl methacrylate, octyl acrylate, octyl methacrylate, lauryl acrylate, lauryl methacrylate, dodecyl acrylate, dodecyl methacrylate, cyclohexyl acrylate, benzyl methacrylate, benzyl acrylate, 4-tert.-butylcyclohexyl acrylate, 4-tert.-butylcyclohexyl methacrylate, 2-cyclohexylpropyl-1-methacrylate, 3-methoxybutyl acrylate, 3-methoxybutyl methacrylate, 2-phenylethyl acrylate, 2-phenylethyl methacrylate, 2,2,3,3-tetrafluoropropyl methacrylate, tetrahydrofurfuryl-2-acrylate, tetrahydrofurfuryl-2-methacrylate and mixtures of these monomers.

Examples of suitable or preferred monomers d' include hexane diol bisacrylic acid ester, trimethylolpropane trisacrylic acid ester, pentaerythritol trisacrylic acid ester, neopentylglycol bisacrylic acid ester and divinyl benzene.

The anhydride functional copolymers generally have a number average molecular weight ($M_n$) determined by gel permeation chromatography using calibrated polystyrenes of about 1800 to 28,000, preferably about 2000 to 15,000 and more preferably about 2,600 to 7,500. Their anhydride equivalent weight (quantity containing 1 mole of anhydride groups) is about 196 to 9800, preferably about 245 to 1960 and more preferably about 392 to 980.

The anhydride functional copolymers were prepared in known manner by a radically initiated copolymerization, preferably in the presence of organic solvents. The polymerization medium used may be any solvent conventionally used in the coatings industry which is inert towards the monomers and copolymers under the conditions of polymerization.

Suitable solvents include esters such as propyl acetate, butyl acetate, isobutyl acetate, sec.-butyl acetate, amyl acetate, hexyl acetate, benzyl acetate, ethyl propionate, butyl propionate, isobutyl isobutyrate, ethoxypropyl acetate, propylene glycol methylether acetate, oxohexyl acetate (Exxate 600, available from Exxon) and oxoheptyl acetate (Exxate 700, available from Exxon); ethers such as diisopropyl ether, dibutyl ether, dioxane and dimethyldiglycol; hydrocarbons such as petroleum hydrocarbons, turpentine oil, solvent naphtha, terpenes, hexane, heptane, octane, cyclohexane, toluene, xylene and ethyl benzene; ketones such as methylethyl ketone, methyl isobutyl ketone, methyl-n-amyl ketone, methyl-isoamyl ketone, diethyl ketone, ethylbutyl ketone, diisopropyl ketone, cyclohexanone, methylcyclohexanone and isophorone; and mixtures of such solvents. Preferred solvents were those which boil at $\geq 110°$ C. under normal conditions and those which form an azeotropic mixture with water such as xylene, butyl acetate, solvent naphtha and oxohexyl acetate.

Copolymerization is normally carried out at solids contents of about 30 to 95% by weight and under an inert gas such as $N_2$.

As a general rule, part or all of the solvent is introduced into the reaction vessel and the monomer mixture, initiator and, if necessary, part of the solvent were added continuously. Stirring is continued after all the components have been added. Polymerization is terminated after at a monomer conversion greater than 96%, preferably greater than 99%.

It may be necessary to carry out a reactivation by subsequent addition of small quantities of initiator in order to achieve the desired monomer conversion. When certain compositions of monomer starting materials were used, the copolymer may contain significant quantities of residual monomers after polymerization. For reasons of cost and because these residual monomers may interfere with the intended use purpose of the polymer or its quality, it is advisable to reduce this residual monomer content either by distillation or by reactivation with initiator.

In an alternative method, part of the anhydride functional monomers may be introduced into the reaction vessel together with the solvent prior to the addition of the other monomers or the anhydride functional monomer may be added more rapidly than the other monomers. These modified methods of preparation may in certain cases improve the compatibility or other properties of the binders.

The monomer conversion is assessed by determining the solids content of the reaction mixture and is checked by a gas chromatographic residual monomer analysis.

It is preferred to use radical formers which were suitable for reaction temperatures of about 60° to 180° C. Examples of these radical formers include organic peroxides such as dibenzoyl peroxide, di-tert.-butyl peroxide, dilauryl peroxide, tert.-butyl peroctoate, tert.-butyl peroxymaleate, tert.-butyl peroxybenzoate, dicumylperoxide and didecanoyl peroxide; and azo compounds such as 2,2'-azo-bis-(2,4-dimethylvaleronitrile), 2,2-azo-bis-(isobutyronitrile) 2,2'-azo-bis-(2,3-dimethylbutyronitrile) and 1,1-azo-bis-(1-cyclohexanonitrile).

The initiators may be used in quantities of about 0.5 to 10% by weight, based on the total quantity of monomers. Molecular weight regulating substances such as n-dodecyl mercaptan, tert.-dodecyl mercaptan, etc., may be added in quantities of 0 to about 10% by weight.

For carrying out the process according to the invention, the anhydride groups present in the copolymers were converted into imide groups. This is preferably carried out in a 10 to 80% organic solution by a reaction with amino alcohols corresponding to the general formula IV. The amino alcohols used have a molecular weight of at least 61, preferably about 75 to 300, and contain 1 to 5, preferably 1 to 3 and more preferably 1 or 2 hydroxyl groups in addition to a primary amino group.

Examples of suitable amino alcohols include 2-aminoethanol, 1-aminoethanol, 3-amino-1-propanol, 2-amino-1-propanol, 1-amino-2-propanol, 2-amino-2-methyl-1-propanol, 2-amino-2-methyl-1,3-propane diol, 2-amino-2-hydroxymethyl-1,3-propane diol, 2-(2-aminoethoxy)-ethanol, 2-amino-1-butanol, 4-amino-1-butanol, 3-amino-1-butanol, 2-amino-1-cyclohexanol, 3-amino-1-cyclohexanol, 4-amino-1-cyclohexanol, 2-amino-1-(hydroxymethyl)-cyclopentane, galactosamine, 2-amino-1-hexanol, 6-amino-1-hexanol, 2-amino-1-phenyl ethanol, 2-amino-3-methyl-1-butanol, 1-(aminomethyl)-cyclohexanol, noradrenaline, 6-amino-2-methyl-2-heptanol, norphenylephedrine, norpseudoephedrine, 2-amino-3-methyl-1-pentanol, 2-amino-4-methyl-1-pentanol, (5-hydroxy-1,3,3-trimethyl-1-cyclohexylmethyl)-amine, 2-(aminomethyl)-3,3,5-trimethyl-cyclopentanol, 2-amino-1-pentanol, 5-amino-1-pentanol, 2-amino-2-phenylethanol, 2-amino-1-phenyl-1,3-propane diol, 2-amino-1-phenyl-propanol-1, 2-amino-3-phenyl-propanol-1, 1-amino-2,3-propane diol, 2-amino-1,3-propane diol, 3,4-dihydroxy-norephedrine, 4-aminophenol, 2-(4-aminophenoxy)ethanol, 4-aminobenzyl alcohol, 3-aminobenzyl alcohol, 2-aminobenzyl alcohol, 2-amino-9-fluorenol, 1-amino-4-(2-hydroxyethyl)-piperazine, 2-amino-3-hydroxypyridine, 2-amino-1-(4-hydroxy-3-methoxy-phenyl)-ethanol, 1-amino-2-naphthol, 1-amino-4-naphthol, 1-amino-7-naphthol, 2-amino-3-naphthol, 2-amino-1-(4-nitro-phenyl)-1,3-propane diol, 1-(3-aminophenyl)-ethanol, 2-(2-aminophenyl)-ethanol, 2-(4-aminophenyl)-ethanol, 2-((3-aminopropyl)-methylamino)ethanol, 2-(4-aminophenoxy)-ethanol, 4-amino-2,6-dichlorophenol, 2-amino-4-chloro-6-nitrophenol, 1-amino-4-hydroxyanthraquinone, 4-amino-2-hydroxybenzoic acid phenyl ester, 4-amino-3-hydroxy-butyric acid ethyl ester and 5-[(3-aminobenzoyl)-amino]-2-hydroxybenzoic acid methyl ester. Reaction products of one equivalent of hydrazine and one equivalent of ethylene carbonate or propylene carbonate were also suitable in principle for use as amino alcohols. Copolymers according to the invention containing structural units I and containing heteroatoms of the type mentioned above in the group $R_1$ were obtained by using the corresponding amino alcohols IV.

The preferred amino alcohols contain a primary amino group, one or two hydroxyl groups and 2 to 4 carbon atoms. Examples of particularly suitable amino alcohols include 2-amino-1-ethanol, 2- or 3-amino-1-propanol, 1-amino-2-propanol, the isomeric amino butanols and the isomeric amino propane diols.

For carrying out the process according to the invention, the anhydride functional copolymers and the amino alcohols were used in amounts sufficient to provide 1.0 to 2.0, preferably 1.0 to 1.5 and more preferably 1.0 to 1.2 equivalents of amino groups for each anhydride group.

Suitable solvents for the imidization reaction include the preferred solvents for the preparation of the anhydride-functional copolymers.

In the process according to the invention, the amino alcohol component, which may be a mixture of several different amino alcohols, is introduced into the reaction vessel, optionally together with suitable solvents, and heated to a temperature of $\geq 100°$ C. The dissolved anhydride functional copolymer is then added at temperatures of about 100° to 200° C. preferably at 120° to 148° C. The reaction may be carried out under such conditions that the water of reaction is distilled off azeotropically at the water separator simultaneously with the addition of the polymer. According to one variation of the process, the total quantity of anhydride functional copolymer may be initially added and the water of reaction may subsequently be split off and then distilled, preferably azeotropically.

The splitting off of water is carried out at about 100° to 200° C., preferably at 120° to 148° C. until either the theoretical quantity of water has been split off or no more water is split off. This splitting off of water may be accelerated, e.g., by passing a stream of inert gas either through the reaction mixture or over the reaction mixture. The imidization reaction is continued until the end products have acid numbers of $\leq 25$, preferably $\leq 15$ and more preferably $\leq 10$, based polymer solids.

For obtaining very low acid numbers it may be advisable under certain conditions to add small quantities of amino alcohol, about 0.05 to 0.2 equivalents thereof, towards the end of the reaction in order to replace losses due to, e.g., azeotropic distillation.

The molecular weights ($M_n$) of the hydroxy functional polyimide copolymers were approximately equal to the molecular weights ($M_n$) determined by gel permeation chromatography of the anhydride functional copolymers, increased by the calculated molecular weight of the amino alcohols used and minus the quantity of water split off.

When anhydride functional copolymers were mixed with amino alcohols, highly viscous intermediate products may be formed depending upon the reaction conditions, especially if anhydride functional copolymers having a high molecular weight and/or a high anhydride equivalent weight were used. In such cases it may be advisable to keep the concentration of reaction products low. The viscosity of such products, however, falls to a lower level during the reaction so that the products always remain stirrable.

When certain copolymers were used and when the amino alcohol is used in excess, the amino alcohol may be added to the anhydride functional polymer previously introduced into the reaction vessel. To determine whether a particular copolymer is suitable for this procedure, it is necessary to carry out a preliminary test since gel particles may be formed under unsuitable conditions in this variation of the process.

After termination of the imidization reaction, excess amino alcohol may be removed from the end product, if necessary, by a brief distillation, preferably azeotropically, with a suitable solvent such as xylene, butyl acetate, solvent naptha or oxohexyl acetate.

In the imidization reaction, small quantities of stabilizers such as triphenyl phosphite, phosphorous acid, dicyclopentadiene, anthracene or isoprene may be added, for example, in order to reduce discoloration reactions.

In another embodiment of the process according to the invention, the polyimide polyols initially obtained as products of the process were modified by a reaction with lactone to bring about ring opening ester formation.

Suitable lactones include, for example, those containing 3 to 15 carbon atoms in the ring which may also contain various substituents. Preferred lactones include $\gamma$-butyrolactone, $\delta$-valerolactone, $\epsilon$-caprolactone, and $\beta$-hydroxy-$\beta$-methyl-$\delta$-valerolactone.

The lactones were used in quantities of about 0.05 to 5.0 moles, preferably about 0.25 to 2.5 moles, of lactone per hydroxyl group in the polyimide copolymer. The reaction is carried out for about 0.5 to 5 hours at about 100° to 150° C., optionally with the addition of suitable catalysts (such as paratoluene sulphonic acid, dibutyl tin oxide or dibutyl tin dilaurate) in quantities of about 0.01 to 1.0%.

In this variation of the process, the hydroxy functional copolymers obtained according to the invention have structural units of formula I in which the $R_1$ group does not correspond to the $R_1$ group of the amino alcohol originally put into the process because it contains additional ester groups.

The hydroxy functional polyimide copolymers according to the invention were readily soluble polymers having acid numbers of $<25$ and a very variable hydroxy group content of about 0.1 to 35% by weight, preferably about 0.5 to 8% by weight. They may be used as binders or binder components in lacquers, coating compositions, sealants, adhesives or printing inks. They were particularly suitable for use as reactants for organic polyisocyanates in two-component polyurethane lacquers wherein they may be used as the only reactant or they may be used as mixtures with other low molecular weight or relatively high molecular weight polyfunctional hydroxyl or amino compounds.

All the "parts" and "percentages" given in the following examples were based on weight unless otherwise indicated.

EXAMPLES

All products were prepared under a nitrogen atmosphere.

EXAMPLE 1 a) 677 g of butyl acetate were introduced into a 5 liter reaction vessel equipped with stirrer, condenser and heating device and the butyl acetate was heated to 125° C. A mixture of 300 g of butyl acetate, 480 g of maleic acid anhydride, 900 g of butyl acrylate, 600 g of methyl methacrylate and 1020 g of styrene was added in the course of 4 hours and 343 g of tert.-butyl peroctoate (70% solution in hydrocarbons) were added simultaneously therewith but over a period of 5 hours. The resulting reaction mixture was then stirred for 1 hour and an approximately 75% anhydride functional copolymer having a maleic acid anhydride content of 14.8% by weight and a molecular weight (Mn) of 5200 was obtained.

b) 63.6 g of amino ethanol (1.1 equivalents) and 318 g of solvent naphtha (mixture of aromatic hydrocarbons having a boiling range of about 160° to 185° C.) were introduced into a 2 liter reaction vessel equipped with stirrer, condenser and heating device and heated to 140° C. 1000 g of polymer 1a (1.0 equivalent) diluted to a solids content of 62.7% with solvent naphtha were then added over a period of about 1 hour. The reaction temperature dropped during this time to 125° C. After all the components had been added, the reflux condenser was replaced by a water separator and the reaction mixture was maintained at reflux for about 5 hours until no more water of reaction was split off. The reflux temperature was raised to about 148° C. during the reaction by the removal of entraining agents. Excess ethanolamine was at the same time removed azeotropically. The hydroxy functional polyimide copolymer 1 was obtained as a clear, 52.6% solution. The total acid number was 4.1, based on solids, and the hydroxyl group content was about 2.4%, based on solids. The copolymer contained about 18% by weight of the structural unit corresponding to the formula:

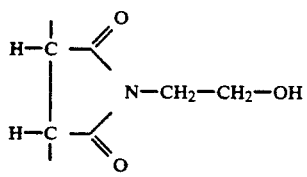

EXAMPLE 2 a) 1667 g of Exxate 600 solvent (oxohexyl acetate, available from Exxon) were introduced into a 5 liter reaction vessel equipped with stirrer, condenser and heating device and heated to 148° C. A mixture of 375 g of maleic acid anhydride, 750 g of butyl acrylate, 300 g of methyl methacrylate and 950 g of styrene was added in 3 hours and 125 g of di-tert.-butyl peroxide were added simultaneously therewith but over a period of 3.5 hours and the resulting reaction mixture was stirred for 2 hours. An approximately 60% anhydride functional copolymer having a maleic acid anhydride content of 15% by weight and a molecular weight ($M_n$) of 2950 was obtained.

b) 61.9 g of amino ethanol (1.1 equivalents) dissolved in 268 g of Exxate 600 solvent and 1000 g (1.0 equivalent) of polymer 2a) were reacted together by the process described under 1b). The hydroxy functional polyimide copolymer 2 was obtained as a clear, 52.9% solution. The total acid number was 2.8, based on solids, and the hydroxyl group content was about 2.5%, based on solids. The copolymer contained about 19% by weight of the structural unit set forth in Example 1.

EXAMPLE 3 a) 677 g of solvent naphtha were introduced into a 5 liter reaction vessel equipped with stirrer, condenser and heating device and heated to 142° C. A mixture of 300 g of solvent naphtha, 420 g of maleic acid anhydride, 900 g of butyl acrylate, 660 g of methyl methacrylate and 1020 g of styrene was added in the course of 4 hours and 343 g of tert.-butyl peroctoate (70% solution in hydrocarbons) were added simultaneously therewith but over a period of 5 hours. When the resulting reaction mixture had been stirred for 1 hour, an approximately 75% anhydride functional copolymer containing 13% by weight of maleic acid anhydride and having a molecular weight ($M_n$) of 2610 was obtained.

b) 240 g of anhydride functional copolymer 3a (1.0 equivalent) and 163 g of solvent naphtha were introduced into a 1 liter reaction vessel equipped with stirrer, condenser, heating device and water separator and 14.5 g of amino ethanol (1.0 equivalent) were added all at once at room temperature. When the reaction mixture was subsequently heated to 130° C., it passed through a highly viscous intermediate stage and water was split off until the reaction was almost complete. The temperature rose to about 140° C. during this time. The hydroxy functional polyimide copolymer 3 was obtained as a clear solution having a solids content of 47.0%, an acid number of 6.6, based on solids, and a calculated hydroxyl group content of about 2.1%, based on solids. The amount of the structural unit illustrated in Example 1b was about 16% by weight.

EXAMPLE 4 a) 985 g of xylene were heated to 120° C. in a 2 liter reaction vessel equipped with stirrer, condenser and heating device. A mixture of 150 g of maleic acid anhydride, 250 g of butyl acrylate, 365 g of methyl methacrylate and 200 g of vinyl acetate was added over a period of 3 hours and 50 g of tert.-butyl peroctoate were added simultaneously therewith but over a period of 3.5 hours. After a further 2 hours' stirring, an approximately 50% anhydride functional copolymer containing 15% by weight of maleic acid anhydride and having a molecular weight ($M_n$) of 2900 was obtained.

b) 400 g of polymer 4a (1.0 equivalent), 75 g of xylene and 25.3 g of 2-amino-1-propanol (1.1 equivalents) were reacted together by the method described in Example 1b. A dissolved hydroxy functional polyimide copolymer 4 having a solids content of about 43%, an acid number of about 14, based on solids, and a calculated hydroxyl group content of about 2.4%, based on solids, was obtained. The copolymer contained about 20% by weight of the structural unit corresponding to the formula:

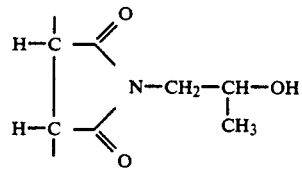

EXAMPLE 5 a) 420 g of solvent naphtha and 105 g of methoxypropyl acetate were heated to 150° C. in a 2 liter reaction vessel equipped with stirrer, condenser and heating device. A mixture of 240 g of maleic acid anhydride, 450 g of butyl acrylate and 810 g of styrene was added over a period of 4 hours, and 75 g of di-tert.-butyl peroxide were added at the same time but over a period of 5 hours. The reaction mixture was then distilled until the reaction temperature had returned to 150° C. and stirring was then continued for 2 hours. An approximately 75% anhydride functional copolymer was obtained, which was diluted to a solids content of about 60% with butyl acetate. The maleic acid anhydride content was 15.2% and the molecular weight ($M_n$) was 4000.

b) 63.2 g of amino ethanol (1.0 equivalent), 147.2 g of solvent naphtha and 147.2 g of butyl acetate were heated to 120° C. in a 2 liter reaction vessel. 1100 g of polymer 5a (1.0 equivalent) were then added in 15 minutes and the reaction temperature was increased to 140° C. The reflux temperature was adjusted to 148 C by the discharge of solvent and 3.1 g (0.05 equivalents) of amino ethanol were subsequently added after a reaction time of about 3 hours. When no more water was split off, the reaction mixture was briefly distilled and then diluted to a solids content of 50.5% with methoxypropyl acetate. The hydroxy functional polyimide copolymer 5 had an acid number of 9.3, based on solids, and a hydroxyl group content of about 2.4%, based on solids. The copolymer contained about 19% of the structural unit set forth in Example 1b).

EXAMPLE 6 a) 1566 g of butyl acetate were heated to 125° C. in a 4 liter reaction vessel equipped with stirrer, condenser and heating device. A mixture of 400 g of butyl acetate, 400 g of maleic acid anhydride, 920 g of butyl acrylate, 400 g of methyl methacrylate and 200 g of styrene was added in the course of 3 hours and 57 g of tert.butyl peroctoate were added simultaneously therewith but over a period of 3.5 hours. The resulting reaction mixture was then stirred for 2 hours and an approximately 50% solution of an anhydride functional copolymer containing 20% of maleic acid anhydride and having a molecular weight ($M_n$) of 3800 was obtained.

b) 80.4 g of amino ethanol (1.3 equivalents), 203 g of solvent naphtha and 1000 g of polymer 6a (1.0 equivalent) were reacted together by the process described in Example 1b. A clear solution of hydroxy functional polyimide copolymer 6 having an acid number of 9, based on solids, a hydroxyl group content of 3.0%, based on solids, and a solids content of 52.4% was obtained. The copolymer contained about 25% by weight of the structural unit set forth in Example 1b.

EXAMPLE 7 a) 3333 g of butyl acetate and 1667 g of solvent naphtha were heated to 136° C. in a 25 kg reaction vessel equipped with stirrer, condenser and heating device. A mixture of 1830 g of maleic acid anhydride, 3538 g of butyl acrylate, 1830 g of methyl methacrylate and 4392 g of styrene was added in the course of 4 hours and 871 g of tert.-butyl peroctoate (70% solution in hydrocarbons) dissolved in 349 g of butyl acetate were added simultaneously therewith but over a period of 4.5 hours. After the resulting reaction mixture had been stirred for 3 hours, an approximately 60% anhydride functional copolymer having a maleic acid anhydride content of 15% and a molecular weight ($M_n$) of 4050 was obtained.

b) 73.4 g of amino ethanol (1.3 equivalents), 283 g of solvent naphtha and 1000 g (1.0 equivalents) of polymer 7a were reacted together by the process described in Example 1b. The hydroxy functional polyimide copolymer 7 was obtained in the form of a 54.6% solution. The total acid number was about 3.5, based on solids, the hydroxyl group content was about 2.4, based on solids, and the amount of the structural unit corresponding to the formula set forth in Example 1b was about 19% by weight.

EXAMPLE 8 a) 2500 g of butyl acetate and 2500 g of solvent naphtha were heated to 160° C. in a 25 liter reaction vessel equipped with stirrer, condenser and heating device. A mixture of 1400 g of solvent naphtha, 790 g of butyl acetate, 1830 g of maleic acid anhydride, 3480 g of butyl acrylate and 6280 g of styrene was added in the course of 4 hours and 610 g of di-tert.-butyl peroxide dissolved in 610 g of butyl acetate were added simultaneously therewith but over a period of 4.5 hours. The resulting reaction mixture was then stirred for 3 hours at 155° C. and an anhydride functional copolymer containing 14% of maleic acid anhydride and having a solids content of 63% and a molecular weight ($M_n$) of 2850 was obtained.

b) 38.2 g of amino ethanol, 103.6 g of solvent naphtha, 103.6 g of butyl acetate and 650 g of polymer 8a were reacted together by the method described in Example 1b. 100 g of methoxypropyl acetate were added towards the end of the reaction. The hydroxy functional polyimide copolymer 8 obtained had an acid number of 15, based on solids, a solids content of 54%, a calculated hydroxyl group content of about 2.3%, based on solids, and the amount of the structural unit corresponding the formula set forth in Example 1b was about 17% by weight.

EXAMPLE 9 a) 1125 g of butyl acetate and 1125 g of solvent naphtha were heated to 138° C. in a 10 liter reaction vessel equipped with stirrer, condenser and heating device. A mixture of 571 g of solvent naphtha, 415 g of butyl acetate, 824 g of maleic acid anhydride, 1592 g of butyl acrylate, 824 g of methyl methacrylate and 1976 g of styrene was added in the course of 3 hours and 392 g of tert.-butyl peroctoate (70% solution in hydrocarbons) and 156 g of butyl acetate were added simultaneously therewith but over a period of 3.5 hours. After a further 2 hours stirring, a 60% solution of an anhydride functional copolymer having a maleic acid anhydride content of 15% and a molecular weight ($M_n$) of 3900 was obtained.

b) 61.6 g of amino ethanol (1.1 equivalents), 261.6 g of solvent naphtha and 1000 g of polymer 9a (1.0 equivalent) were reacted together by the method described in Example 1b. The hydroxy functional polyimide copolymer 9 was obtained as a clear solution having a solids content of 55.5%, an acid number of 7, based on solids, a hydroxyl group content of 2.4%, based on solids, and contained 18% of the structural unit described in Example 1b.

EXAMPLE 10 a) 400 g of solvent naphtha were heated to 160° C. in a 4 liter reaction vessel equipped with stirrer, condenser and heating device. A mixture of 225 g of solvent naphtha, 400 g of maleic acid anhydride, 1250 g of 2-ethylhexyl methacrylate, 350 g of cyclohexyl methacrylate and 500 g of styrene was added over a period of 4 hours and 200 g of di-tert.-butyl peroxide were added simultaneously therewith but over a period of 4.5 hours. The polymerization temperature dropped to 130° C. during this time. 0.5 hours after addition of the peroxide, the temperature was raised to 150° C. by distillation and the reaction mixture was then stirred for a further 3 hours. An approximately 78.5% solution of an anhydride functional copolymer having a maleic acid anhydride content of 14.8% and a molecular weight (Mn) of 2800 was obtained.

b) 16.7 g of amino ethanol (1.0 equivalents), 193 g of solvent naphtha and 299 g (1.0 equivalent) of preliminary stage 10a) were reacted together by the method described in Example 1b). A clear, approximately 49% solution of the hydroxy functional polyimide copolymer 10 was obtained having an acid number of 9.5, based on solids, a hydroxyl group content of about 2.4%, based on solids, and contained about 18% by weight of the structural unit described in Example 1b. The molecular weight (Mn) was 2852.

EXAMPLE 11 a) 1333 g of solvent naphtha were heated to 147° C. in a 4 liter reaction vessel equipped with stirrer, condenser and heating device. A mixture of 100 g of maleic acid anhydride, 500 g of methyl methacrylate, 600 g of butyl acrylate and 700 g of styrene was added in the course of 3.5 hours and 100 g of di-tert.-butyl peroxide were added simultaneously therewith but over a period of 4 hours. When the resulting reaction mixture had been stirred for 1.5 hours, an approximately 60% solution of an anhydride functional copolymer having a maleic acid anhydride content of 5% and a molecular weight ($M_n$) of 2400 was obtained.

b) 5.6 g of amino ethanol (1.0 equivalent), 107 g of solvent naphtha and 300 g of polymer 11a (1.0 equivalent) were reacted by the method described in Example 3b to form the hydroxy functional polyimide copolymer 11 which was obtained as a clear, 47% solution. The copolymer had an acid number of 7, based on solids, a hydroxyl group content of about 0.8%, based on solids, and contained about 6.5% of the structural unit described in Example 1b.

EXAMPLE 12 a) 985 g of xylene were heated to 120° C. in a 2 liter reaction vessel equipped with stirrer, condenser and heating device. A mixture of 150 g of maleic acid anhydride, 250 g of butyl acrylate, 365 g of methyl methacrylate and 200 g of butylvinyl ether was added over a period of 3 hours and 50 g of tert.-butyl peroctoate were added simultaneously but over a period of 3.5 hours. When the resulting reaction mixture had been stirred for 2 hours, an approximately 50% solution of an anhydride functional copolymer having a maleic acid anhydride content of 15% and a molecular weight ($M_n$) of 2700 was obtained.

b) 400 g (1.0 equivalent) of polymer 12a, 75.4 g of xylene and 25.3 g of 1-amino-2-propanol (1.1 equivalents) were reacted by the method described in Example 1b) to form hydroxy functional polyimide copolymer 12. The clear solution obtained had a solids content of about 44%. The copolymer had an acid number of 7, based on solids, a calculated hydroxyl group content of about 2.4%, based on solids, and contained about 20% of the structural unit described in Example 4b.

EXAMPLE 13 a) 2046 g of isoamyl acetate were heated to 138° C. in a 6 liter reaction vessel equipped with stirrer, condenser and heating device. A mixture of 375 g of maleic acid anhydride, 750 g of butyl acrylate, 300 g of methyl methacrylate and 950 g of styrene was added over a period of 3 hours and 25 g of di-tert.-butyl peroxide were added simultaneously but over a period of 3.5 hours. When the resulting reaction mixture had been stirred for 2 hours, a 55%, anhydride functional copolymer having a maleic acid anhydride content of 15% and a molecular weight ($M_n$) of 6700 was obtained.

b) 330 g (1.0 equivalent) of polymer 13a, 230 g of isoamyl acetate and 24.8 g (1.2 equivalents) of 1-amino-2-propanol were reacted together as described in Example 1b. The hydroxy functional polyimide copolymer 13 was obtained as a clear, 42% solution. The copolymer had an acid number of 14, based on solids, and a hydroxyl group content was 2.3%, based on solids. The polymer contained about 21% by weight of the structural unit described in Example 4b.

EXAMPLE 14

363 g (1.0 equivalent) of copolymer 2a) were reacted with 40 g of 4-aminophenol (1.1 equivalents) and 150 g of Exxate 600 solvent by the method described in 1b. The hydroxy functional polyimide copolymer 14 was obtained as a clear, dark, 45% solution. The polymer contained about 24% by weight of the structural unit corresponding to the formula:

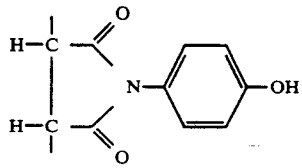

EXAMPLE 15

363 g (.0 equivalent) of copolymer 2a) were reacted with 47 g of N-methyl-N-(3-aminopropyl)-ethanolamine (1.1 equivalent) and 150 g of Exxate 600 solvent by the method described in 1b. The hydroxy functional polyimide copolymer 15) was obtained as a clear solution having a solids content of about 45%. The copolymer had an acid number of 6, based on solids, a hydroxyl group content of about 2.1%, based on solids, and contained about 22% by weight of the structural unit corresponding to the formula:

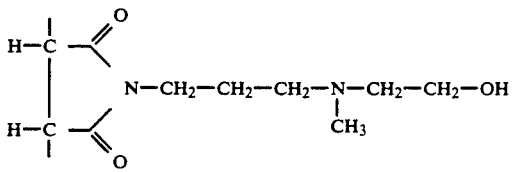

EXAMPLE 16 a) 208 g of solvent naphtha and 208 g of butyl acetate were heated to 120° C. in a 4 liter reaction vessel equipped with stirrer, condenser and heating device. A mixture of 700 g of maleic acid anhydride, 700 g of styrene, 540 g of 2-ethylhexyl acrylate, 208 g of solvent naphtha and 208 g of butyl acetate was added in the course of 3 hours and 86 g of tert.-butyl peroctoate were added simultaneously therewith but over a period of 3.5 hours. When the resulting reaction mixture had been stirred for 2 hours, the anhydride functional copolymer 16 obtained had a 70% solids content, a maleic acid anhydride content of 35%, based on solids, and a molecular weight ($M_n$) of 3600.

b) 31.5 g (1.1 equivalents) of 1-amino-2-propanol, 360 g of Exxate 600 solvent and 300 g of polymer 16a (1.0 equivalent) were reacted together by the method described in Example 1b. The hydroxy functional polyimide copolymer 16 obtained had a hydroxyl group content of 4.9%, based on solids, an acid number of about 14, based on solids, and contained about 40% by weight of the structural unit described in Example 4b.

EXAMPLE 17 a) 300 g of Exxate 600 solvent were heated to 140° C. in a 2 liter reaction vessel equipped with stirrer, condenser and heating device. A mixture of 100 g of maleic acid anhydride, 296 g of methyl methacrylate, 208 g of butyl acrylate, 80 g of ethylhexyl methacrylate and 100 g of styrene was added over a period of 3 hours and 22.9 g of tert.-butyl peroctoate (70% solution in hydrocarbons) were added simultaneously but over a period of 3.5 hours. When the resulting reaction mixture had been stirred for 2 hours, an approximately 75% anhydride functional copolymer having a maleic acid anhydride content of 12.5% and a molecular weight ($M_n$) of 3300 was obtained.

b) 500 g (1.0 equivalent) of anhydride functional copolymer 17 was diluted to a solids content of 55% with solvent naphtha, mixed with 73.5 g of solvent naphtha and 23.5 g (1.1 equivalents) of amino ethanol and reacted by the method described in Example 1b. The hydroxy functional copolymer 17 was obtained in the form of a clear solution. It has a solids content of 44.6%, an acid number of 10, based on solids, a hydroxyl group content of 2.0%, based on solids, and contained about 16% by weight of the structural unit described in Example 1b.

EXAMPLE 18 a) 300 g of Exxate 600 solvent were heated to 140° C. in a 2 liter reaction vessel equipped with stirrer, condenser and heating device. A mixture of 160 g of maleic acid anhydride, 160 g of methyl methacrylate, 208 g of butyl acrylate, 80 g of 2-ethylhexyl methacrylate and 160 g of styrene was added over a period of 3 hours and 45.9 g of tert.-butyl-peroctoate (70% solution in hydrocarbons) and 29 g of Exxate 600 solvent were added simultaneously therewith but over a period of 3.5 hours. When the resulting reaction mixture had been stirred for 2 hours, an anhydride functional copolymer having a solids content of approximately 70%, a maleic acid anhydride content of 20% and a molecular weight ($M_n$) of 2850 was obtained.

b) 37.6 9 of amino ethanol (1.1 equivalents), 87.6 g of solvent naphtha and 500 g (1.0 equivalent) of copolymer 18a which had been diluted to a solids content of 55% with solvent naphtha were reacted together by the method described in Example 1b. After termination of the reaction, the reaction mixture was diluted to a solids content of 40% with butyl acetate. The hydroxy functional copolymer 18 obtained had an acid number of 7, based on solids, a hydroxyl group content of about 2.5%, based on solids and contained about 25% by weight of the structural unit described in Example 1b.

EXAMPLE 19 a) 1602 g of xylene were heated to 120° C. in a 4 liter reaction vessel equipped with stirrer, condenser and heating device. A mixture of 300 g of maleic acid anhydride, 600 g of butyl acrylate, 420 g of 2-ethylhexyl methacrylate and 600 g of styrene was added over a period of 3 hours and 114 g of tert.-butyl peroctoate (70% solution in hydrocarbons) were added simultaneously therewith but over a period of 3.5 hours. The reaction mixture was then heated to 140° C. and stirred for a further 2 hours. The anhydride functional copolymer obtained had a solids content of approximately 55%, a maleic acid anhydride content of 15% and a molecular weight ($M_n$) of 3800.

b) 27.7 g (1.1 equivalents) of amino ethanol, 132 g of xylene and 500 g (1.0 equivalent) of copolymer 19a were reacted together by the method described in Example 1b. The hydroxy functional polyimide copolymer 19 obtained had a solids content of about 49%, an acid number of 6, based on solids, a hydroxyl group content of about 2.4%, based on solids, and contained about 19% by weight of the structural unit described in Example 1b.

EXAMPLE 20 a) 450 g of solvent naphtha were heated to 160° C. in a 1 liter reaction vessel equipped with stirrer, condenser and heating device. A mixture of 75 g of maleic acid anhydride, 20 g of hexane diol bis-acrylic acid ester, 225 g of butyl acrylate, 130 g of styrene and 10 g of n-dodecyl mercaptan was added over a period of 3 hours and 30 g of di-tert.-butyl peroxide and 50 g of solvent naphtha were added simultaneously therewith but over a period of 4 hours. When the resulting reaction mixture had been stirred for 1 hour, an anhydride functional copolymer having a solids content of about 50% and a maleic acid anhydride content of 15% was obtained.

b) 21.3 g (1.1 equivalents) of amino ethanol, 87.4 g of solvent naphtha and 400 g (1.0 equivalent) of copolymer 20a were reacted together by the process described in Example 1b. The hydroxy functional polyimide copolymer 20) obtained had a solids content of 47%, an acid number of 1.5, based on solids, a hydroxyl group content of about 2.4%, based on solids, and contained about 19% by weight of the structural unit described in Example 1b.

EXAMPLE 21 a) 415 g of butyl acetate and 416 g of solvent naphtha were heated to 120° C. in a 4 liter reaction vessel equipped with stirrer, condenser and heating device. A mixture of 300 g of maleic acid anhydride, 640 g of methyl methacrylate, 600 g of butyl acrylate, 100 g of 2-ethylhexyl acrylate and 300 g of styrene was added over a period of 3 hours and 86 g of tert.-butyl peroctoate (70% solution in hydrocarbons) were added simultaneously therewith but over a period of 3.5 hours. When the resulting reaction mixture had been stirred for 2 hours, an anhydride functional copolymer having solids content of 70%, a maleic acid anhydride content of 15% and a molecular weight ($M_n$) of 5300 was obtained.

b) 16.8 g of amino ethanol (1.2 equivalents), 160 g of solvent naphtha and 300 g (1.0 equivalent) of anhydride functional copolymer 21a which had been diluted to a solids content of 50% with solvent naphtha were reacted together by the method described in Example 1b. The hydroxy functional polyimide copolymer 21 obtained had an acid number of about 6, based on solids, a solids content of about 43%, a hydroxyl group content of about 2.4%, based on solids, and contained about 19% by weight of the structural unit described in Example 1b.

EXAMPLE 22 a) 985 g of xylene were introduced into a 2 liter reaction vessel equipped with stirrer, condenser and heating device and heated to 110° C. A mixture of 45 g of methyl methacrylate, 200 g of vinyl acetate, 120 g of maleic acid anhydride, 100 g of lauryl methacrylate, 200 g of ethyl acrylate, 200 g of cyclohexyl methacrylate and 100 g of a methacrylic acid ester mixture containing an average of 17.4 carbon atoms in the alcohol group (Röhm GmbH) was added over a period of 3 hours and 50 g of tert.-butyl peroctoate were added simultaneously therewith but over a period of 3.5 hours. When the resulting reaction mixture had been stirred for 2 hours, an anhydride functional copolymer having a solids content of approximately 48%, a maleic acid anhydride content of 12% and a molecular weight ($M_n$) of 3400 was obtained.

b) 20.2 g of 1-amino-3-propanol (1.1 equivalents), 69 g of xylene and 400 g (1.0 equivalent) of anhydride functional copolymer 22a were reacted by the method described in Example 16. A solution of the hydroxy functional polyimide copolymer 22 was obtained. This copolymer had an acid number of about 15, based on solids, a hydroxyl group content of about 1.8%, based on solids, and contained about 14% of the structural unit corresponding to the formula:

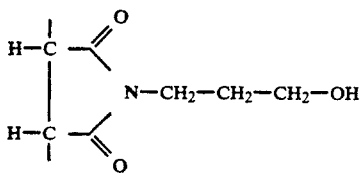

EXAMPLE 23

300 g (1.0 equivalent) of the anhydride functional copolymer described in Example 2a were reacted with 46.6 g of 2-(4-aminophenoxy)-ethanol (1.1 equivalents) in 158 g of Exxate 600 solvent by the method described in Example 1b. The resulting hydroxyl containing polyimide copolymer 23 had an acid number of 13, based on solids, a solids content of 45%, a hydroxyl group content of about 2.0%, based on solids, and contained about 25% by weight of the structural unit corresponding to the formula:

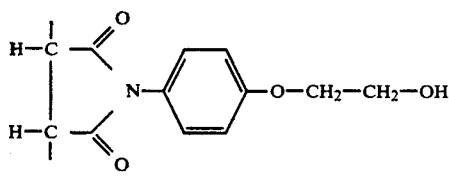

EXAMPLE 24 a) 881 g of xylene were heated to 120° C. in a 2 liter reaction vessel. A mixture of 220 g of maleic acid anhydride, 110 g of methyl methacrylate, 121 g of butyl acrylate, 385 g of 2-ethylhexyl methacrylate and 220 g of styrene was added over a period of 3 hours and 63 g of tert.-butyl peroctoate were added simultaneously therewith but over a period of 3.5 hours. When the resulting reaction mixture has been stirred for 2 hours, an anhydride functional copolymer having a solids content of approximately 55%, a maleic acid anhydride content of 20% and a molecular weight ($M_n$) of 3300 was obtained.

b) 45.9 g (1.1 equivalents) of 1-amino-2-propanol, 161.7 g of xylene and 500 g (1.0 equivalent) of anhydride functional copolymer 24a were reacted by the method described in Example 1b. The hydroxy functional polyimide copolymer 24 obtained as a clear solution had a solids content of about 49%, an acid number of 10, based on solids, a hydroxyl group content of about 3.0%, based on solids, and contained about 27% by weight of the structural unit described in Example 4b.

EXAMPLE 25 a) 881 g of xylene were heated to 120° C. in a 2 liter reaction vessel equipped with stirrer, condenser and heating device. A mixture of 165 g of maleic acid anhydride, 330 g of methyl methacrylate, 396 g of 2-ethylhexyl methacrylate and 165 g of styrene was added in the course of 3 hours and 63 g of tert.-butyl peroctoate (70% solution in hydrocarbons) were added simultaneously therewith but over a period of 3.5 hours. When the resulting reaction mixture had been stirred for 2 hours, an approximately 55% solution of an anhydride functional copolymer having a maleic acid anhydride content of 15% and a molecular weight ($M_n$) of 3300 was obtained.

b) 34 g (1.1 equivalents) of 1-amino-2-propanol, 140.4 g of xylene and 500 g (1.0 equivalent) of anhydride functional copolymer 25a were reacted by the method described in Example 1b. The hydroxy functional polyimide copolymer 25 was obtained as a clear, approximately 49% solution which had an acid number of 10, based on solids, a hydroxyl group content of about 2.3%, based on solids, and contained about 21% by weight of the structural unit described in Example 4b.

EXAMPLE 26

500 g (1.0 equivalent) of the anhydride functional copolymer described in Example 11a, 189 g of solvent naphtha and 189 g of 2-amino-2-hydroxymethyl-1,3-propane diol (1.05 equivalents) were reacted together by the method described in Example 1b. The hydroxy functional polyimide copolymer 26 was obtained as an approximately 47% solution. The copolymer had an acid number of 8, based on solids, a hydroxyl group content of about 2.4%, based on solids, and contained about 9% by weight of the structural unit corresponding to the formula:

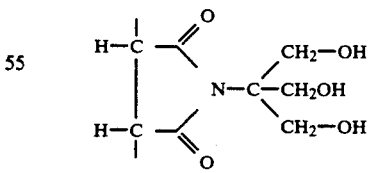

EXAMPLE 27 a) 800 g of xylene were heated to 120° C. in a 2 liter reaction vessel equipped with stirrer, condenser and heating device. A mixture of 165 g of maleic acid anhydride, 330 g of butyl acrylate, 253 g of 2-ethylhexyl methacrylate and z5 330 g of styrene was added in the course of 3 hours and 31 g of tert.-butyl peroctoate were added simultaneously therewith but over a period of 3.5 hours. When the resulting reaction mixture has been stirred for 2 hours, an approximately 55% solution of an anhydride functional copolymer having a maleic acid anhydride content of 15% and a molecular weight ($M_n$) of 4300 was obtained.

b) 34.7 g (1.1 equivalents) of 1-amino-2-propanol, 154 g of xylene and 500 g (1.0 equivalent) of anhydride functional copolymer 27a were reacted by the method described in Example 1b. The hydroxy functional polyimide copolymer 27 was obtained as a clear, approximately 47% solution. The copolymer had an acid number of 8, based on solids, a hydroxyl group content of about 2.3%, based on solids, and contained about 21% by weight of the structural unit described in Example 4b.

EXAMPLE 28

300 g (1.0 equivalent) of hydroxy functional polyimide copolymer 9, 29.1 g (1.0 equivalent) of ε-caprolactone and 0.2 g of dibutyl tin dilaurate were heated to 120° C. for 3 hours. The modified polyimide copolymer 28 obtained had a hydroxyl group content of about 1.9% by weight, based on solids, and contained about -8% of the structural unit corresponding to the formula:

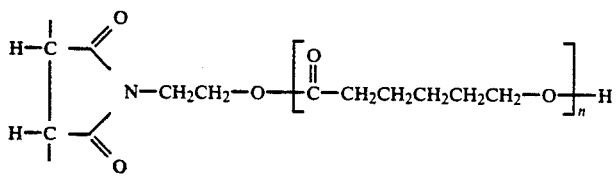

wherein n had an average value of 1.

EXAMPLE 29

300 g (1.0 equivalent) of hydroxy functional polyimide copolymer 2, 55.4 g of ε-caprolactone (2.0 equivalents) and 0.2 g of dibutyl tin dilaurate were stirred together at 130° C. for 3 hours. The modified polyimide copolymer 29 obtained had a hydroxyl group content of about 1.6% by weight, based on solids, and contained about 37% by weight of the structural unit described in Example 28. In this case, however, n had an average value of 2.

EXAMPLE 30

400 g (1.0 equivalent) of anhydride functional copolymer 19a, 115.5 g of xylene, 13.6 g of 1-amino-2-propanol (0.55 equivalents) and 16.2 g of 2-amino-2-methyl-2-propanol (0.55 equivalents) were reacted together by the method described in Example 1b. The hydroxy functional polyimide copolymer 30 was obtained as a clear, 42% solution. The copolymer had an acid number of 22, based on solids, a hydroxyl group content of about 2.2%, based on solids and contained a total of 22% by weight of structural unit corresponding to the formula:

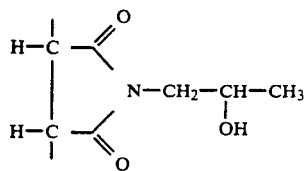

and the structural unit corresponding to formula:

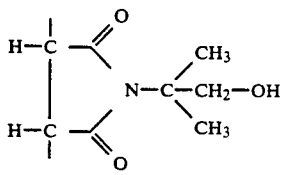

EXAMPLE 31 a) 990 g of xylene were heated to 120° C. in a 2 liter reaction vessel equipped with stirrer, condenser and heating device. A mixture of 150 g of maleic acid anhydride, 575 g of methyl methacrylate, 50 g of 2-ethylhexyl acrylate and 200 g of styrene was added in the course of 3 hours and 35.7 g of tert.-butyl peroctoate (70% solution in hydrocarbons) were added simultaneously therewith but over a period of 3.5 hours. When the resulting reaction mixture had been stirred for 2 hours, an anhydride functional copolymer was obtained having a solids content of approximately 50%, a maleic acid anhydride content of 15% by weight, based on solids, and a molecular weight ($M_n$) of 3100.

b) 25.7 g of 1-amino-2-propanol, 84 g of xylene and 400 g of copolymer 31a were reacted as described in Example 1b) to form a hydroxy functional polyimide copolymer 31 which had an acid number of 9.5, based on solids, a hydroxyl group content of about 2.3%, based on solids, and contained about 21% by weight of the structural unit described in Example 4b. The product was obtained as a pale yellow solid after distillative separation of the solvent and drying at 50° C.

EXAMPLE 32 a) 1478 g of xylene were introduced into a 4 liter reaction vessel equipped with stirrer, condenser and heating device and heated to 115° C. A mixture of 180 g of maleic acid anhydride, 150 g of cyclohexene, 150 g of lauryl methacrylate, 217.5 g of 2-phenylethyl acrylate, 150 g of a methacrylic acid ester mixture containing an average of 17.4 carbon atoms in the alcohol group, 225 g of benzyl acrylate and 375 g of methyl methacrylate was added in the course of 3 hours and 75 g of tert.-butyl peroctoate were added simultaneously therewith but over a period of 3.5 hours. When the resulting reaction mixture had been stirred for 2 hours, it was reactivated by 2 additions (4.3 g each) of tert.- butyl peroctoate followed by stirring for 3 hours. An anhydride functional copolymer having a solids content of approximately 49%, a maleic acid anhydride content of 12% by weight and a molecular weight ($M_n$) of 2700 was obtained.

b) 16.4 g of amino ethanol (1.1 equivalents) and 400 g of copolymer 32a were reacted in 64 g xylene by the method described in Example 1b. A hydroxy functional polyimide copolymer 32 was obtained which had an acid number of about 8, based on solids, a hydroxyl group content of about 1.9%, based on solids, and contained about 15% by weight of the structural unit described in Example 1b.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A hydroxy functional copolymer having a molecular weight ($M_n$) of about 2000 to 30,000 and containing
   a) about 1 to 70% by weight of structural units corresponding to formula I

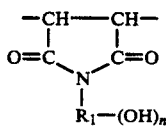

b) about 1 to 75% by weight of structural units corresponding to formula II

c) about 15 to 98% by weight of structural units corresponding to formula III

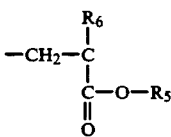

and
   d) about 0 to 15% by weight of other structural units which are derived from chemically incorporated polyfunctional monomers containing 2 or more copolymerizable, unsaturated bonds wherein the percentages of components a), b), c) and d) add up to 100, based on the total weight of components a), b), c) and d), and which has been prepared by reacting the corresponding anhydride functional copolymer with an amino alcohol corresponding to the formula $H_2N\text{-}R_1\text{-}(OH)_n$ and wherein n represents an integer having a value of 1 to 5, $R_1$ represents an aliphatic hydrocarbon group which has 2 to 13 carbon atoms and may contain ester groups, $R_2$ represents hydrogen, a methyl or ethyl group or chlorine or fluorine, $R_3$ represents a cycloaliphatic hydrocarbon group having 5 to 10 carbon atoms, an araliphatic hydrocarbon group having 7 to 18 carbon atoms, an aromatic hydrocarbon group having 6 to 12 carbon atoms, chlorine, fluorine, a nitrile group or an aliphatic hydrocarbon group which has 2 to 18 carbon atoms and may contain oxygen and/or nitrogen in the form of ether, ester, amide, urethane or keto groups, $R_4$ represents hydrogen or together with $R_3$ and the two carbon atoms represents a cycloaliphatic hydrocarbon ring having 5 to 6 carbon atoms, $R_5$ represents an aliphatic or cycloaliphatic hydrocarbon group which has 1 to 18 carbon atoms and may contain oxygen or nitrogen as heteroatoms and $R_6$ represents hydrogen or a methyl group.

2. The hydroxy functional copolymer of claim 1 wherein
   n represents an integer having a value of 1 to 3,
   $R_2$ represents hydrogen, a methyl or ethyl group, or chlorine
   $R_3$ represents a phenyl group,
   $R_4$ represents hydrogen,
   $R_5$ represents an aliphatic hydrocarbon group having 1 to 18 carbon atoms and
   $R_6$ represents hydrogen or a methyl group.

3. The hydroxy functional copolymer of claim 1 wherein said hydroxy functional copolymer has a molecular weight ($M_n$) of about 2600 to 8000 and contains
   a) about 5 to 55% by weight of structural units corresponding to formula I,
   b) about 3 to 60% by weight of structural units corresponding to formula II and
   c) about 25 to 85% by weight of structural units corresponding to formula III.

4. The hydroxy functional copolymer of claim 2 wherein said hydroxy functional copolymer has a molecular weight ($M_n$) of about 2600 to 8000 and contains
   a) about 5 to 55% by weight of structural units corresponding to formula I,
   b) about 3 to 60% by weight of structural units corresponding to formula II and
   c) about 25 to 85% by weight of structural units corresponding to formula III.

5. The hydroxy functional copolymer of claim 1 wherein said hydroxy functional copolymer has an acid number of $\leq 25$ and a hydroxyl group content of about 0.5 to 8% by height.

6. The hydroxy functional copolymer of claim 2 wherein said hydroxy functional copolymer has an acid number of $\leq 25$ and a hydroxyl group content of about 0.5 to 8% by height.

7. The hydroxy functional copolymer of claim 3 wherein said hydroxy functional copolymer has an acid number of $\leq 25$ and a hydroxyl group content of about 0.5 to 8% by height.

8. The hydroxy functional copolymer of claim 4 wherein said hydroxy functional copolymer has an acid number of $\leq 25$ and a hydroxyl group content of about 0.5 to 8% by height.

* * * * *